United States Patent
Joo et al.

(10) Patent No.: US 9,615,229 B2
(45) Date of Patent: Apr. 4, 2017

(54) METHOD AND APPARATUS FOR AUTOMATICALLY CREATING MESSAGE

(71) Applicant: Samsung Electronics Co., Ltd., Suwon-si, Gyeonggi-do (KR)

(72) Inventors: Jae-Seok Joo, Seongnam-si (KR); Tae-Ho Kim, Cheongju-si (KR); Myung-Gon Hong, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/864,251

(22) Filed: Sep. 24, 2015

(65) Prior Publication Data
US 2016/0088453 A1 Mar. 24, 2016

(30) Foreign Application Priority Data

Sep. 24, 2014 (KR) ........................ 10-2014-0127427

(51) Int. Cl.
*H04M 3/42* (2006.01)
*H04W 4/16* (2009.01)
*H04W 4/14* (2009.01)
*H04M 3/436* (2006.01)

(52) U.S. Cl.
CPC ......... *H04W 4/16* (2013.01); *H04M 3/42382* (2013.01); *H04M 3/436* (2013.01); *H04W 4/14* (2013.01)

(58) Field of Classification Search
USPC .................................. 455/412.2, 414.1, 417
See application file for complete search history.

(56) References Cited

U.S. PATENT DOCUMENTS

| | | | |
|---|---|---|---|
| 2007/0015496 A1 | 1/2007 | Yoon et al. | |
| 2013/0237258 A1 | 9/2013 | Yoon | |
| 2014/0057610 A1* | 2/2014 | Olincy | H04M 3/42365 455/414.1 |

FOREIGN PATENT DOCUMENTS

| | | |
|---|---|---|
| KR | 10-2006-0058758 A | 5/2006 |
| KR | 10-2007-0119197 A | 12/2007 |
| KR | 10-2009-0075551 A | 7/2009 |
| KR | 10-1043168 B1 | 6/2011 |
| KR | 10-2013-0010700 A | 1/2013 |
| KR | 10-2013-0104006 A | 9/2013 |

* cited by examiner

*Primary Examiner* — Joel Ajayi
(74) *Attorney, Agent, or Firm* — Jefferson IP Law, LLP

(57) ABSTRACT

A method and an apparatus for automatically creating a message in an electronic device are provided. The method includes detecting at least one current situation of a user of the electronic device and automatically creating a message comprising content reflecting the at least one current situation.

19 Claims, 17 Drawing Sheets

METHOD AND APPARATUS FOR AUTOMATICALLY CREATING MESSAGE

CROSS-REFERENCE TO RELATED APPLICATION(S)

This application claims the benefit under 35 U.S.C. §119(a) of a Korean patent application filed on Sep. 24, 2014 in the Korean Intellectual Property Office and assigned Serial number 10-2014-0127427, the entire disclosure of which is hereby incorporated by reference.

TECHNICAL FIELD

The present disclosure relates to a method and an apparatus for automatically creating a message in an electronic device.

BACKGROUND

Electronic devices enabling wireless communication or wired communication can accept or reject incoming calls. When rejecting the incoming calls, the electronic devices can transmit call rejection messages to senders.

The electronic device can, for example, select one of call rejection messages previously stored in the electronic device and transmit the selected call rejection message, or transmit a call rejection message directly written by a user. The call rejection message may be added or revised by the user.

When an electronic device transmits a call rejection message to a sender, the electronic device may select, by a user, one of messages previously stored in the electronic device and transmit the selected message, or transmit a message directly written by the user. For example, when the selected and transmitted message among the previously stored messages is a message not suitable to a current situation of the user, there is an inconvenience that the user must additionally write a message for additional description to transmit the message.

Therefore, a need exists for a message automatic creation method and apparatus for automatically creating various messages reflecting a current situation of a user.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a message automatic creation method and apparatus for automatically creating various messages reflecting a current situation of a user.

In accordance with an aspect of the present disclosure, a method of creating a message in an electronic device is provided. The method includes detecting at least one current situation of a user of the electronic device and automatically creating the message comprising content reflecting the at least one current situation.

In accordance with another aspect of the present disclosure, an electronic device is provided. The electronic device includes a communication module and a processor configured to control the communication module, detect at least one current situation of a user of the electronic device, and create a message comprising content automatically reflecting the at least one current situation.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
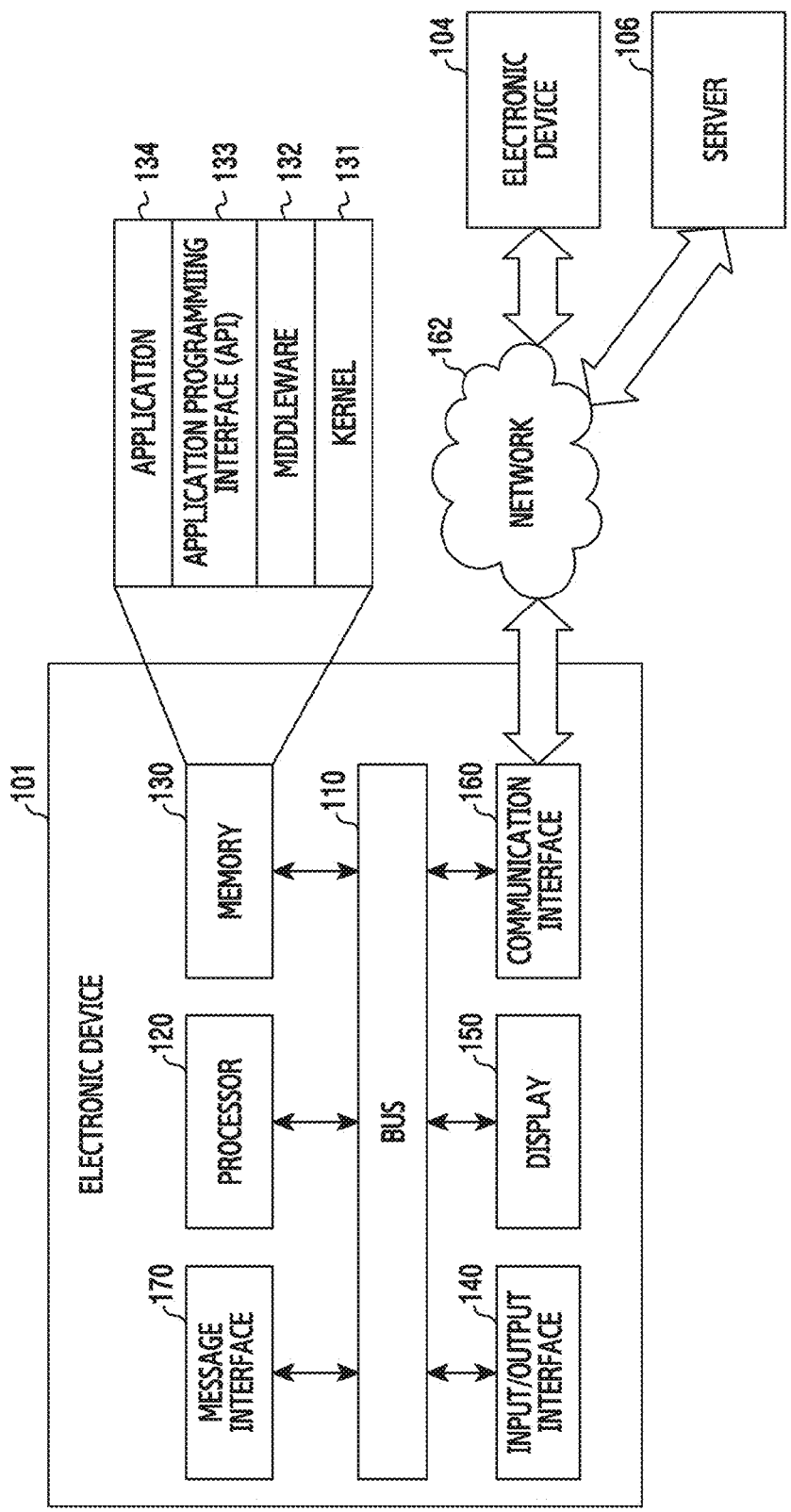
FIG. 1 is a diagram illustrating a network environment including an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The expressions "comprise" or "may comprise" usable in various embodiments of the present disclosure indicate the existence of disclosed corresponding functions, operations, or constituent elements, and do not limit additional one or more functions, operations, or constituent elements. In addition, in various embodiments of the present disclosure, the terms "comprise" or "have" are to designate the existence of features, numerals, operations, constituent elements, components, which are stated in the specification, or a combination of them, and should be understood that they are not to previously exclude the possibility of existence or addition of one or more other features, numerals, operations, constituent elements, components, or combinations of them.

In various embodiments of the present disclosure, the expressions, such as "or" include any and all combinations of words enumerated together. For example, "A or B" may include A, or may include B, or may include all A and B. The expressions "1st", "2nd", "first" or "second" used in various embodiments of the present disclosure may modify various constituent elements of various embodiments of the present disclosure, but do not intend to limit the corresponding constituent elements. For example, the expressions do not limit the order and/or importance of the corresponding constituent elements. The expressions may be used to distinguish one constituent element from another constituent element. For example, all of a first user device and a second user device are user devices, and represent different user devices. For example, a first constituent element may be named as a second constituent element without departing from the scope of right of the present disclosure. Likely, even a second constituent element may be named as a first constituent element.

When it is mentioned that any constituent element is "connected" or "accessed" to another constituent element, it should be understood that the any constituent element may be directly connected or accessed to the another constituent element, but a third constituent element may also exist between the any constituent element and the another constituent element. On the other hand, when it is mentioned that any constituent element is "directly connected" or "directly accessed" to another constituent element, it should be understood that no third constituent element exists between the any constituent element and the another constituent element.

The terms used in various embodiments of the present disclosure are used to just describe specific embodiments, and do not intend to limit various embodiments of the present disclosure.

Unless defined otherwise, all terms used herein including technological or scientific terms have the same meaning as those commonly understood by a person having ordinary knowledge in the art to which various embodiments of the present disclosure belong. Terms as defined in a general dictionary should be interpreted as meanings consistent with the contextual meanings of a related technology, and are not interpreted as ideal or excessively formal meanings unless defined clearly in various embodiments of the present disclosure.

An electronic device according to various embodiments of the present disclosure may be a device including a telecommunication function. For example, the electronic device may include at least one of a smart phone, a tablet personal computer (PC), a mobile phone, a video phone, an electronic book (e-book) reader, a desktop PC, a laptop PC, a netbook computer, a personal digital assistant (PDA), a portable multimedia player (PMP), a moving picture experts group (MPEG) audio layer 3 (MP3) player, a mobile medical instrument, a camera, or a wearable device (e.g., a head mounted display (HMD), such as electronic glasses, electronic clothes, an electronic bracelet, an electronic necklace, an appcessory, an electronic tattoo, a smart watch, and the like).

According to various embodiments of the present disclosure, the electronic device may be a smart home appliance having a telecommunication function. The smart home appliance, for example, the electronic device may include at least one of a television (TV), a digital versatile disc (DVD) player, an audio system, a refrigerator, an air conditioner, a cleaner, an oven, a microwave, a washing machine, an air cleaner, a set-top box, a TV box (for example, Samsung HomeSync™, Apple TV™, or Google TV™), a game console, an electronic dictionary, an electronic locking system, a camcorder, or an electronic frame.

According to various embodiments of the present disclosure, the electronic device may include at least one of various medical instruments (e.g., magnetic resonance angiography (MRA), magnetic resonance imaging (MRI), computerized tomography (CT), a moving-camera, and an ultrasonic machine), a navigation device, a global positioning system (GPS) receiver, an event data recorder (EDR), a flight data recorder (FDR), a car infotainment device, an electronic equipment for ship (e.g., a navigation device for ship and a gyrocompass), avionics, a security instrument, a head unit for vehicles, an industrial or home robot, an automatic teller's machine (ATM) of a financial institution, or a point of sales (POS) of a shop.

According to various embodiments of the present disclosure, the electronic device may include at least one of one part of furniture or building/structure including a telecommunication function, an electronic board, an electronic signature receiving device, a projector, or various metering instruments (e.g., tap water, electricity, gas, or radio wave metering instrument). The electronic device according to various embodiments of the present disclosure may be one of the aforementioned various devices or a combination of two or more of them. In addition, the electronic device according to various embodiments of the present disclosure may be a flexible device. In addition, it is obvious to those skilled in the art that the electronic device according to various embodiments of the present disclosure is not limited to the aforementioned instruments.

An electronic device according to various embodiments of the present disclosure will be described below with reference to the accompanying drawings. The term 'user' used in various embodiments of the present disclosure may denote a person who uses the electronic device or a device (e.g., an artificial intelligent electronic device) which uses the electronic device.

FIG. 1 is a diagram illustrating a network environment including an electronic device according to various embodiments of the present disclosure.

Referring to FIG. 1, an electronic device 101 may include a bus 110, a processor 120, a memory 130, an input/output interface 140, a display 150, a communication interface 160, and a message interface 170.

The communication interface 160 may, for example, include a call receiving and transmitting unit (not shown). The call receiving and transmitting unit, a communication module capable of receiving or transmitting a voice call, may use a traditional circuit scheme.

In addition, the call receiving and transmitting unit may use a data connection scheme in which a voice call is possible with an Internet telephone or a voice over Internet protocol (VoIP) telephone that is a voice packet network. Not only a hardware construction but also a user interface (UI)/user experience (UX) for receiving a user input may be included in one part of the call receiving and transmitting unit.

The message interface 170 may be, as a constituent element for creating a call rejection message automatically reflecting a current situation of a user of the electronic device 101, included in the processor 120, or may be a separate constituent element interworking with the processor 120.

The message interface 170 may, for example, include a user situation detector (not shown) and a new message creator (not shown). The user situation detector may include a schedule detection module for accurately detecting a user schedule of a current time in order to create a message automatically reflecting a current situation of a user.

In addition, the message interface 170 may include a module for detecting a user's movement situation to detect whether a user is moving or stopping, or determining whether the electronic device 101 is in a driving mode to detect that the user is driving a car, and modules of various types for determining various reservation information (e.g., a movie and a play) of culture events.

Further, when taking user related information on the web to detect all detailed situations of a user, the user situation detector may take and parse hypertext mark-up language (HTML) to extract respective elements, and may extract necessary information from a specific application to detect a current situation of the user.

For example, in a case of a navigation application, the user situation detector may extract a destination, a distance, and an arrival time to detect a current situation of a user. In addition, the user situation detector may capture a display screen to detect a text displayed within a screen, and may store the detected information as a temporary file such that another application can identify the detected information. A method of detecting the text displayed within the screen is possible even on the web.

If a current situation of a user is detected, the new message creator creates a call rejection message automatically reflecting the detected current situation. When creating a message reflecting the detected current situation of the user, the new message creator creates the message suitable to an accurate vocabulary and grammar. For example, if the user purchased a movie ticket of 'Frozen' at a current time, and plans to watch 'Frozen' in the Bucheon CGV movie theater, the new message creator may create a concrete call rejection message of "I can't answer the phone because I'm watching 'Frozen' in the Bucheon CGV movie theater. I'll contact after movie ending".

In addition, if a call is actually income at a movie viewing time zone, the new message creator may transmit the call rejection message automatically, or transmit the call rejection message according to a user's selection. The new message creator may include a grammar check engine to complete a sentence suitable to an accurate grammar. The grammar check engine may identify sender information, for example, the social standing of a sender and, if the sender is a parent or job senior, the grammar check engine may change the call rejection message into a sentence including an honorific language.

The bus 110 may be a circuit connecting the aforementioned constituent elements with one another and forwarding communication (e.g., a control message) between the aforementioned constituent elements. The processor 120 may, for example, receive instructions from the aforementioned other constituent elements (e.g., the memory 130, the input/output interface 140, the display 150, and the communication interface 160) through the bus 110, and decipher the received instructions, and execute operation or data processing according to the deciphered instructions.

The memory 130 may store an instruction or data that is received from the processor 120 or the other constituent elements (e.g., the input/output interface 140, the display 150, and the communication interface 160) or is generated by the processor 120 or the other constituent elements. The memory 130 may include, for example, programming modules, such as a kernel 131, a middleware 132, an application programming interface (API) 133, or an application 134. The aforementioned programming modules each may consist of software, firmware, hardware or a combination of at least two or more of them.

The kernel 131 may control or manage system resources (e.g., the bus 110, the processor 120, or the memory 130) used to execute operations or functions implemented in the remnant other programming modules, for example, the middleware 132, the API 133, or the application 134. In addition, the kernel 131 may provide an interface enabling the middleware 132, the API 133, or the application 134 to access and control or manage the individual constituent element of the electronic device 101.

The middleware 132 may perform a relay role of enabling the API 133 or the application 134 to communicate and exchange data with the kernel 131. In addition, in relation to work requests received from the application 134, the middleware 132 may, for example, perform control (e.g., scheduling or load balancing) for the work requests by using a method of allocating priority order capable of using the system resources (e.g., the bus 110, the processor 120, or the memory 130) of the electronic device 101 to at least one of the applications 134.

The API 133, which is an interface enabling the application 134 to control a function provided by the kernel 131 or the middleware 132, may include, for example, at least one interface or function (e.g., instruction) for file control, window control, picture processing, or character control.

According to various embodiments of the present disclosure, the application 134 may include a short message service (SMS)/multimedia message service (MMS) application, an electronic mail (e-mail) application, a calendar application, an alarm application, a health care application (e.g., an application measuring momentum or blood sugar), or environment information application (e.g., an application providing air pressure, humidity, or temperature information). Additionally or alternatively, the application 134 may be an application related with information exchange between the electronic device 101 and an external electronic device (e.g., another electronic device 104). The application related with the information exchange may include, for example, a notification relay application for relaying specific information to the external electronic device, or a device management application for managing the external electronic device.

For example, the notification relay application may include a function of relaying notification information generated in another application (e.g., the SMS/MMS application, the e-mail application, the health care application, or the environment information application) of the electronic device 101 to the external electronic device (e.g., the other electronic device 104). Additionally or alternatively, the notification relay application may, for example, receive notification information from the external electronic device (e.g., the other electronic device 104) and provide the received notification information to a user. The device management application may, for example, manage (e.g., install, delete or update) a function (e.g., turn-on/turn-off of the external electronic device itself (or some constituent components) or adjustment of a brightness (or resolution) of a display) of at least one part of the external electronic device (e.g., the other electronic device 104) communicating with the electronic device 101, an application operating in the external electronic device, or a service (e.g., a telephony service or a message service) provided in the external electronic device.

According to an embodiment of the present disclosure, the application 134 may include an application designated according to an attribute (e.g., the kind of electronic device) of the external electronic device (e.g., the other electronic device 104). For example, when the external electronic device is an MP3 player, the application 134 may include an application related with music playback. Similarly, when the external electronic device is a mobile medical instrument, the application 134 may include an application related with health care. According to an embodiment of the present disclosure, the application 134 may include at least one of an application designated to the electronic device 101 or an application received from the external electronic device (e.g., a server 106 or the other electronic device 104).

The input/output interface 140 may forward an instruction or data, which is inputted from a user through an input/output device (e.g., a sensor, a keyboard or a touch screen), for example, to the processor 120, the memory 130 and the communication interface 160 through the bus 110. For example, the input/output interface 140 may provide data about a user's touch inputted through the touch screen, to the processor 120. In addition, the input/output interface 140 may, for example, output an instruction or data, which is received from the processor 120, the memory 130 and the communication interface 160 through the bus 110, through an input/output device (e.g., a speaker or a display). For example, the input/output interface 140 may output voice data, which is processed through the processor 120, to the user through the speaker.

The display 150 may display various information (e.g., multimedia data or text data) to a user. The communication interface 160 may establish communication between the electronic device 101 and the external device (e.g., the other electronic device 104 or the server 106). For example, the communication interface 160 may be connected to a network 162 through wireless communication or wired communication, to communicate with the external device. The wireless communication may include, for example, at least one of Wi-Fi, Bluetooth (BT), near field communication (NFC), GPS or cellular communication (e.g., long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM)). The wired communication may include, for example at least one of a universal serial bus (USB), a high definition multimedia interface (HDMI), a recommended standard-232 (RS-232), or a plain old telephone service (POTS).

According to an embodiment of the present disclosure, the network 162 may be a telecommunications network. The telecommunications network may include at least one of a computer network, the Internet, internet of things, or a telephone network. According to an embodiment of the present disclosure, a protocol (e.g., a transport layer protocol, a data link layer protocol, or a physical layer protocol) for communication between the electronic device 101 and an external device may be supported in at least one of the application 134, the API 133, the middleware 132, the kernel 131, or the communication interface 160.

Figure 2:
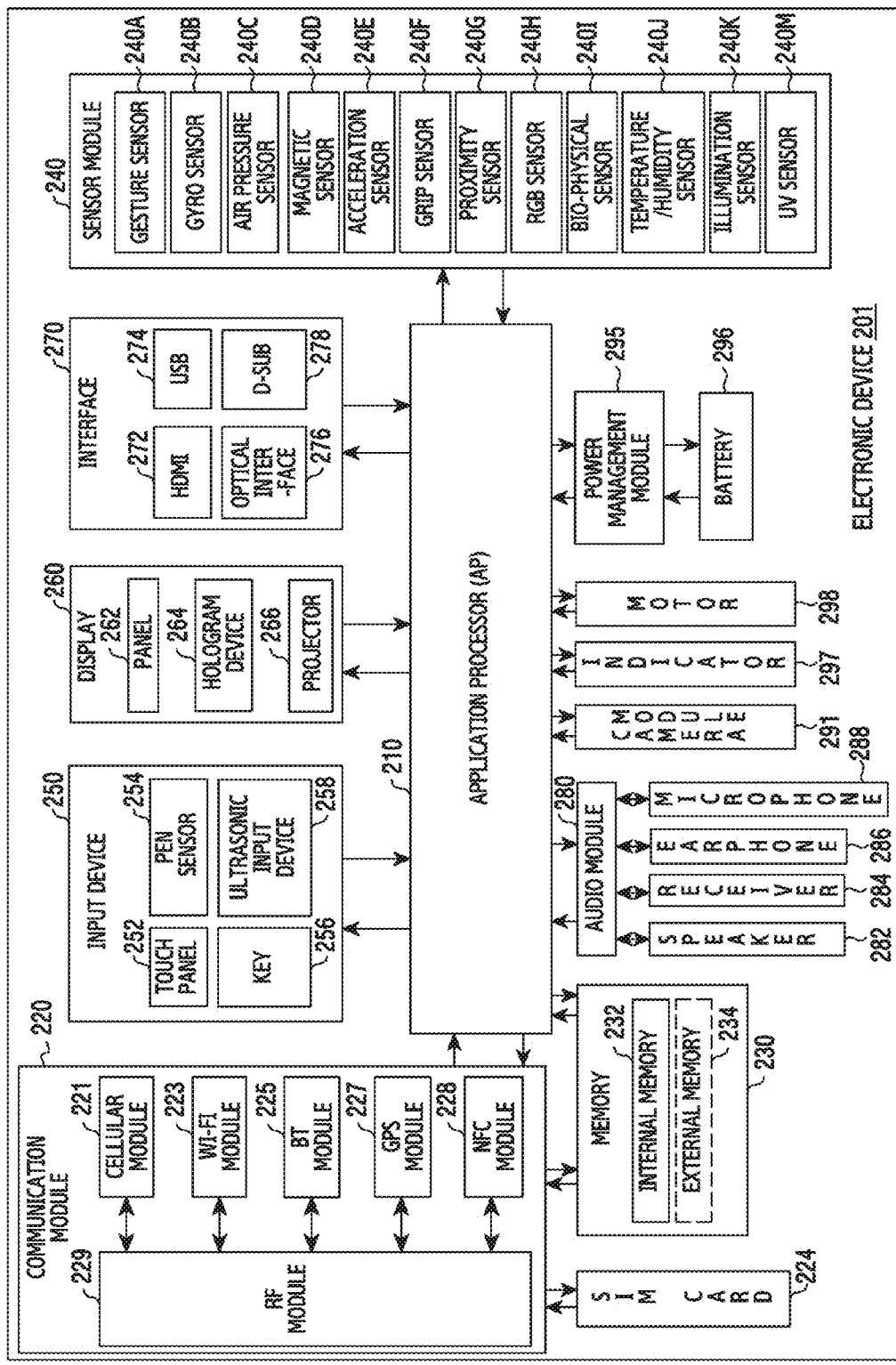
FIG. 2 is a block diagram illustrating a construction of an electronic device according to various embodiments of the present disclosure.
Figure 3A:
FIGS. 3A, 3B, 3C, and 3D are diagrams illustrating a process of transmitting a call rejection message in a general electronic device according to various embodiments of the present disclosure.
Figure 3B:
Figure 3C:
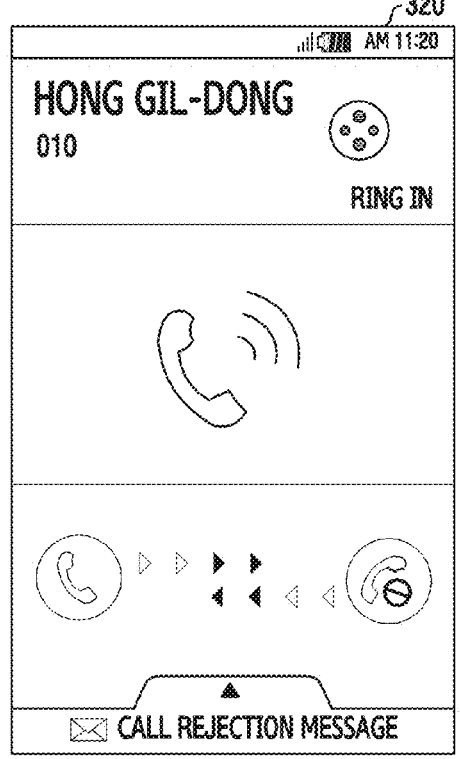
Figure 3D:
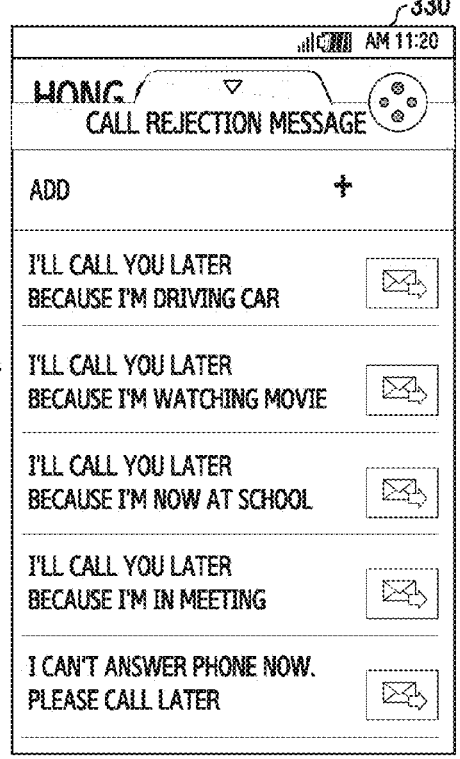

FIG. 2 is a block diagram illustrating a construction of an electronic device according to various embodiments of the present disclosure.

Referring to FIG. 2, an electronic device 201 may construct, for example, the whole or one part of the electronic device 101 illustrated in FIG. 1. The electronic device 201 may include one or more application processors (APs) 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The AP 210 may run an operating system or an application program to control a plurality of hardware or software constituent elements connected to the AP 210, and may perform processing and operation of various data including multimedia data. The AP 210 may be, for example, implemented as a system on chip (SoC). According to an embodiment of the present disclosure, the AP 210 may further include a graphical processing unit (GPU) (not shown).

The communication module 220 (e.g., the communication interface 160) may perform data transmission/reception in communication between the electronic device 201 (e.g., the electronic device 101) and other electronic devices (e.g., the other electronic device 104 or the server 106) connected through a network. According to an embodiment of the present disclosure, the communication module 220 may include a cellular module 221, a Wi-Fi module 223, a BT module 225, a GPS module 227, an NFC module 228, and a radio frequency (RF) module 229.

The cellular module 221 may provide voice telephony, video telephony, a text service, or an Internet service through a telecommunication network (e.g., LTE, LTE-A, CDMA, WCDMA, UMTS, WiBro, or GSM). In addition, the cellular module 221 may, for example, use a SIM (e.g., the SIM card 224) to perform electronic device distinction and authorization within the telecommunication network. According to an embodiment of the present disclosure, the cellular module 221 may perform at least some functions among functions that the AP 210 may provide. For example, the cellular module 221 may perform at least one part of a multimedia control function.

According to an embodiment of the present disclosure, the cellular module 221 may include a communication processor (CP). In addition, the cellular module 221 may be, for example, implemented as an SoC. Referring to FIG. 2, the constituent elements, such as the cellular module 221 (e.g., the CP), the memory 230, or the power management module 295 are illustrated as constituent elements apart from the AP 210 but, according to an embodiment of the present disclosure, the AP 210 may be implemented to include at least some (e.g., the cellular module 221) of the aforementioned constituent elements.

According to an embodiment of the present disclosure, the AP 210 or the cellular module 221 (e.g., the CP) may load an instruction or data, which is received from a non-volatile memory connected to each or at least one of other constituent elements, to a volatile memory and process the loaded instruction or data. In addition, the AP 210 or the cellular module 221 may store data, which is received from at least one of other constituent elements or is generated by at least one of the other constituent elements, in the non-volatile memory.

The Wi-Fi module 223, the BT module 225, the GPS module 227 or the NFC module 228 each may include, for example, a processor for processing data transmitted/received through the corresponding module. Referring to FIG. 2, the cellular module 221, the Wi-Fi module 223, the BT module 225, the GPS module 227 or the NFC module 228 is each illustrated as a separate block but, according to an embodiment of the present disclosure, at least some (e.g., two or more) of the cellular module 221, the Wi-Fi module 223, the BT module 225, the GPS module 227 or the NFC module 228 may be included within one integrated circuit (IC) or IC package. For example, at least some (e.g., the CP corresponding to the cellular module 221 and a Wi-Fi processor corresponding to the Wi-Fi module 223) of the processors each corresponding to the cellular module 221, the Wi-Fi module 223, the BT module 225, the GPS module 227 or the NFC module 228 may be implemented as one SoC.

The RF module 229 may perform transmission/reception of data, for example, transmission/reception of an RF signal. Though not illustrated, the RF module 229 may include, for example, a transceiver, a power amplifier module (PAM), a frequency filter, or a low noise amplifier (LNA). In addition, the RF module 229 may further include a component for transmitting/receiving an electromagnetic wave in a free space for wireless communication, for example, a conductor or a conductive wire. FIG. 2 illustrates that the cellular module 221, the Wi-Fi module 223, the BT module 225, the GPS module 227 and the NFC module 228 share one RF module 229 with one another but, according to an embodiment of the present disclosure, at least one of the cellular module 221, the Wi-Fi module 223, the BT module 225, the GPS module 227 or the NFC module 228 may perform transmission/reception of an RF signal through a separate RF module.

The SIM card 224 may be a card including a SIM, and may be inserted into a slot provided in a specific position of the electronic device 201. The SIM card 224 may include unique identification information (e.g., an integrated circuit card identifier (ICCID)) or subscriber information (e.g., an international mobile subscriber identity (IMSI)).

The memory 230 (e.g., the memory 130) may include an internal memory 232 or an external memory 234. The internal memory 232 may include, for example, at least one of a volatile memory (for example, a dynamic random access memory (DRAM), a static RAM (SRAM) and a synchronous DRAM (SDRAM)) or a non-volatile memory (for example, a one-time programmable read only memory (OTPROM), a PROM, an erasable and programmable ROM (EPROM), an electrically erasable and programmable ROM (EEPROM), a mask ROM, a flash ROM, a NAND flash memory, and a NOR flash memory).

According to an embodiment of the present disclosure, the internal memory 232 may be a solid state drive (SSD). The external memory 234 may further include a flash drive, for example, compact flash (CF), secure digital (SD), micro-SD, mini-SD, extreme digital (xD), or a memory stick. The external memory 234 may be operatively connected with the electronic device 201 through various interfaces. According to an embodiment of the present disclosure, the electronic device 201 may further include a storage device (or a storage media), such as a hard drive.

The sensor module 240 may measure a physical quantity or sense an activation state of the electronic device 201, to convert measured or sensed information into an electric signal. The sensor module 240 may include, for example, at least one of a gesture sensor 240A, a gyro sensor 240B, an air pressure sensor 240C, a magnetic sensor 240D, an acceleration sensor 240E, a grip sensor 240F, a proximity sensor 240G, a color sensor 240H (e.g., a red, green, blue (RGB) sensor), a bio-physical sensor 240I, a temperature/humidity sensor 240J, an illumination sensor 240K, or an ultraviolet (UV) sensor 240M. Additionally or alternatively, the sensor module 240 may include, for example, an E-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), a fingerprint sensor (not shown), a geomagnetic sensor (not shown), and a heart rate sensor (not shown). The sensor module 240 may further include a control circuit for controlling at least one or more sensors belonging to therein.

The input device 250 may include a touch panel 252, a (digital) pen sensor 254, a key 256, or an ultrasonic input device 258. The touch panel 252 may, for example, detect a touch input in at least one of a capacitive overlay scheme, a pressure sensitive scheme, an infrared beam scheme, or an acoustic wave scheme. In addition, the touch panel 252 may also further include a control circuit. In a case of the capacitive overlay scheme, physical contact or proximity detection is possible. The touch panel 252 may also further include a tactile layer. In this case, the touch panel 252 may provide a tactile response to a user.

The (digital) pen sensor 254 may be implemented in the same or similar method to receiving a user's touch input or by using a separate sheet for detection. The key 256 may include, for example, a physical button, an optical key, or a keypad. The ultrasonic input device 258 is a device capable of identifying data by sensing a sound wave with a microphone (e.g., a microphone 288) in the electronic device 201 through an input tool generating an ultrasonic signal, and enables wireless detection. According to an embodiment of the present disclosure, the electronic device 201 may also use the communication module 220 to receive a user input from an external device (e.g., a computer or a server) connected with this.

The display 260 (e.g., the display 150) may include a panel 262, a hologram device 264, or a projector 266. The panel 262 may, for example, be a liquid crystal display (LCD) or an active-matrix organic light-emitting diode (AMOLED). The panel 262 may be implemented to be flexible, transparent, or wearable. The panel 262 may be also constructed as one module along with the touch panel 252. The hologram device 264 may show a three-dimensional image in the air by using interference of light. The projector 266 may project light to a screen to display an image. The screen may be, for example, located inside or outside the electronic device 201. According to an embodiment of the present disclosure, the display 260 may further include a control circuit for controlling the panel 262, the hologram device 264, or the projector 266.

The interface 270 may include, for example, an HDMI 272, a USB 274, an optical interface 276, or a D-subminiature (D-sub) 278. The interface 270 may be included, for example, in the communication interface 170 shown in FIG. 1. Additionally or alternatively, the interface 270 may include, for example, a mobile high-definition link (MHL) interface, an SD card/multimedia card (MMC) interface or an infrared data association (IrDA) standard interface.

The audio module 280 may convert a voice and an electric signal interactively. At least some constituent elements of the audio module 280 may be included, for example, in the input/output interface 20 illustrated in FIG. 1. The audio module 280 may, for example, process sound information which is inputted or outputted through a speaker 282, a receiver 284, an earphone 286, or the microphone 288.

The camera module 291 is a device able to take a still picture and a moving picture. According to an embodiment of the present disclosure, the camera module 291 may include one or more image sensors (e.g., a front sensor or a rear sensor), a lens (not shown), an image signal processor (ISP) (not shown), or a flash (not shown) (e.g., an LED or a xenon lamp). The power management module 295 may manage electric power of the electronic device 201. Though not illustrated, the power management module 295 may include, for example, a power management IC (PMIC), a charger IC, or a battery or fuel gauge.

The PMIC may be, for example, mounted within an integrated circuit or an SoC semiconductor. A charging scheme may be divided into a wired charging scheme and a wireless charging scheme. The charger IC may charge the battery 296, and may prevent the inflow of overvoltage or overcurrent from an electric charger. According to an embodiment of the present disclosure, the charger IC may include a charger IC for at least one of the wired charging scheme or the wireless charging scheme. The wireless charging scheme may, for example, be a magnetic resonance scheme, a magnetic induction scheme, or an electromagnetic wave scheme. A supplementary circuit for wireless charging, for example, a circuit, such as a coil loop, a resonance circuit, a rectifier, and the like, may be added.

The battery gauge may, for example, measure a level of the battery 296, a voltage during charging, a current or a temperature. The battery 296 may generate or store electricity, and use the stored or generated electricity to supply power to the electronic device 201. The battery 296 may include, for example, a rechargeable battery or a solar battery.

The indicator 297 may display a specific status of the electronic device 201 or one part (e.g., the AP 210) thereof, for example a booting state, a message state, or a charging state. The motor 298 may convert an electric signal into a mechanical vibration. Though not illustrated, the electronic device 201 may include a processing device (e.g., a GPU) for mobile TV support. The processing device for mobile TV support may, for example, process media data according to the standards of digital multimedia broadcasting (DMB), digital video broadcasting (DVB), or a media flow.

Each of the aforementioned constituent elements of the electronic device according to various embodiments of the present disclosure may consist of one or more components, and a name of the corresponding constituent element may be different according to the kind of electronic device. The electronic device according to various embodiments of the present disclosure may include at least one of the aforementioned constituent elements, and may omit some constituent elements or further include additional other constituent elements. In addition, some of the constituent elements of the electronic device according to various embodiments of the present disclosure are combined to form one entity, thereby identically performing the functions of the corresponding constituent elements before combination.

FIGS. 3A, 3B, 3C, and 3D are diagrams illustrating a process of transmitting a call rejection message in a general electronic device according to various embodiments of the present disclosure.

Referring to FIGS. 3A, 3B, 3C, and 3D, the electronic device may display a call rejection message writing screen 300 including a virtual touch keyboard and a text input window, so that a user can freely write a call rejection message of desired content.

The electronic device may add and display the call rejection messages written by the user within a call rejection message list screen 310. Thereafter, if a call is income, the electronic device may display a call incoming screen 320 for selecting call connection or call rejection.

If the user selects the call rejection, the electronic device may display a call rejection message selection screen 330 for selecting any one of several call rejection messages, and may interrupt an incoming call after transmitting any one call rejection message selected by the user, or may transmit the call rejection message after rejecting the incoming call.

Accordingly, the call rejection message selected by the user is displayed on a screen of a counterpart electronic device receiving the call rejection message. The call rejection message may include a specific image (e.g., a meeting image) related to call rejection content.

Figure 4:
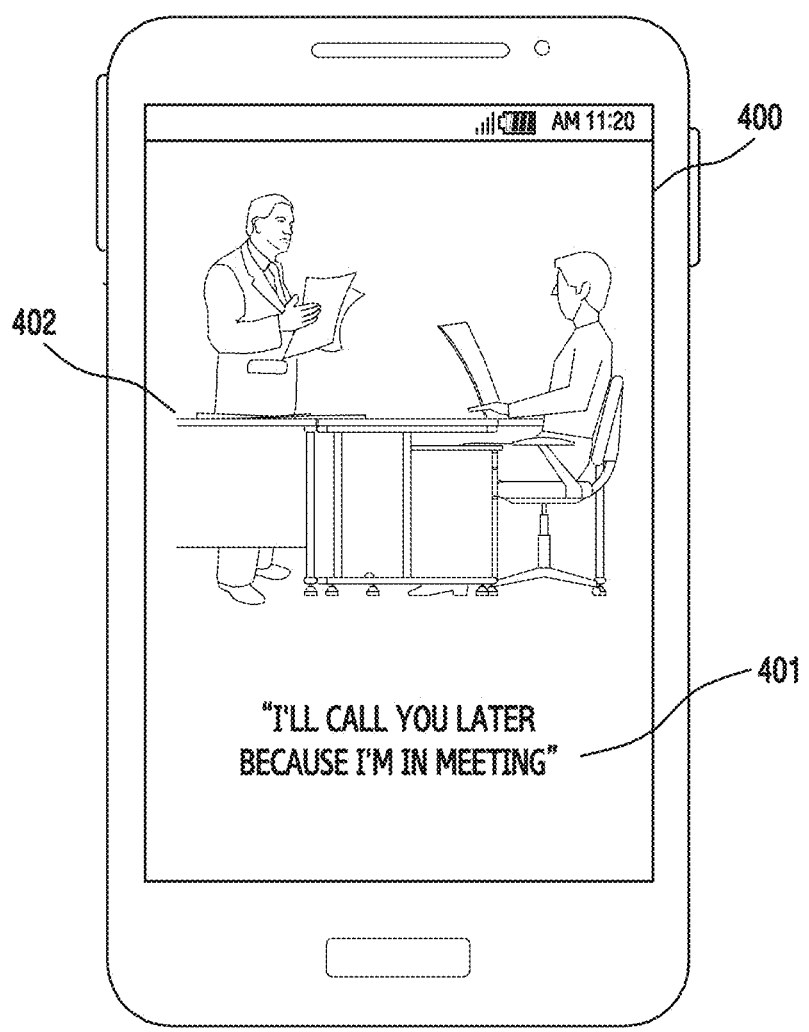
FIG. 4 is a diagram illustrating a display screen displaying a call rejection message according to various embodiments of the present disclosure.

FIG. 4 is a diagram illustrating a display screen displaying a call rejection message according to various embodiments of the present disclosure.

Referring to FIG. 4, a background image 402 showing being in a meeting may be displayed on a screen 400 of the counterpart electronic device, together with the content 401 of "I'll call you later because I'm in a meeting".

Figure 5:
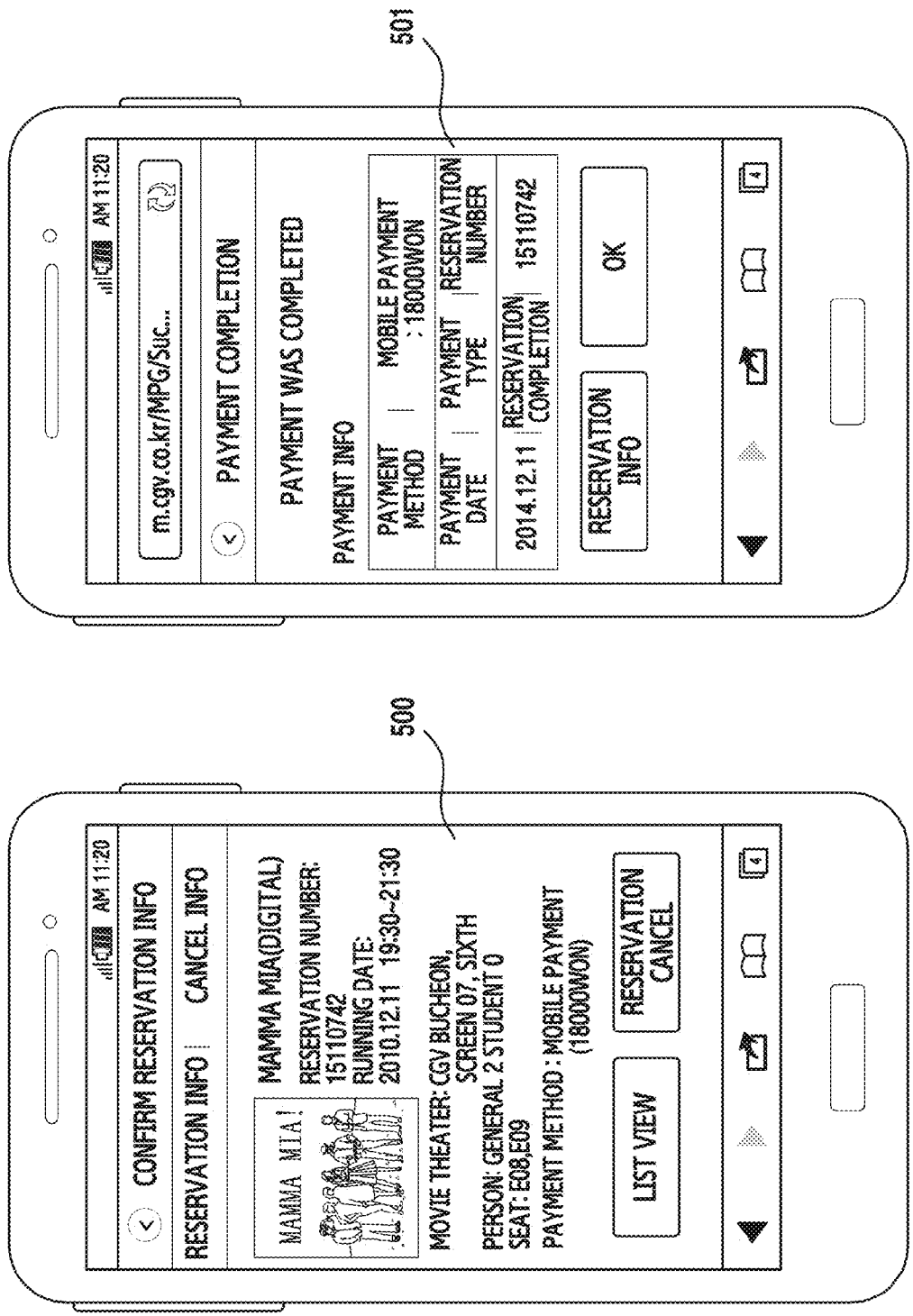
FIGS. 5 and 6 are diagrams illustrating a process of creating a call rejection message reflecting movie reservation information according to various embodiments of the present disclosure.
Figure 6:
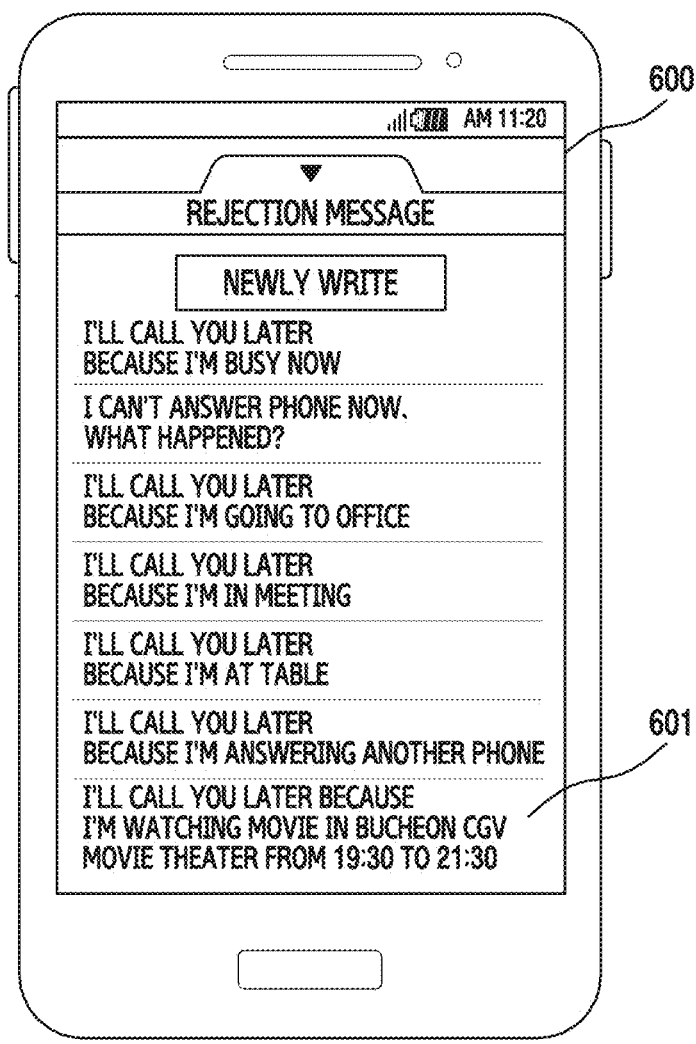

FIGS. 5 and 6 are diagrams illustrating a process of creating a call rejection message reflecting movie reservation information according to various embodiments of the present disclosure.

Referring to FIG. 5, when a user uses the electronic device to reserve a movie ticket on-line, the processor 120 of the electronic device may extract running time information of a corresponding movie and theater information thereof from reservation information 500 and 501 and then, automatically create a call rejection message that is effective during a movie running time.

Referring to FIG. 6, the processor 120 of the electronic device may display a call rejection message 601 that is automatically created based on movie reservation information.

The call rejection message 601 may include the content of "I'll call you later because I'm watching a movie when (e.g., 19:30 to 21:30) in which movie theater (e.g., Bucheon CGV movie theater)". The call rejection message 601 may be automatically added and stored within a call rejection message list 600, or may be stored through a user's confirming or editing process.

If a running time (e.g., 19:30 to 21:30) lapses, the call rejection message 601 may be deleted automatically, or may be edited or deleted through user's confirmation.

Figure 7:
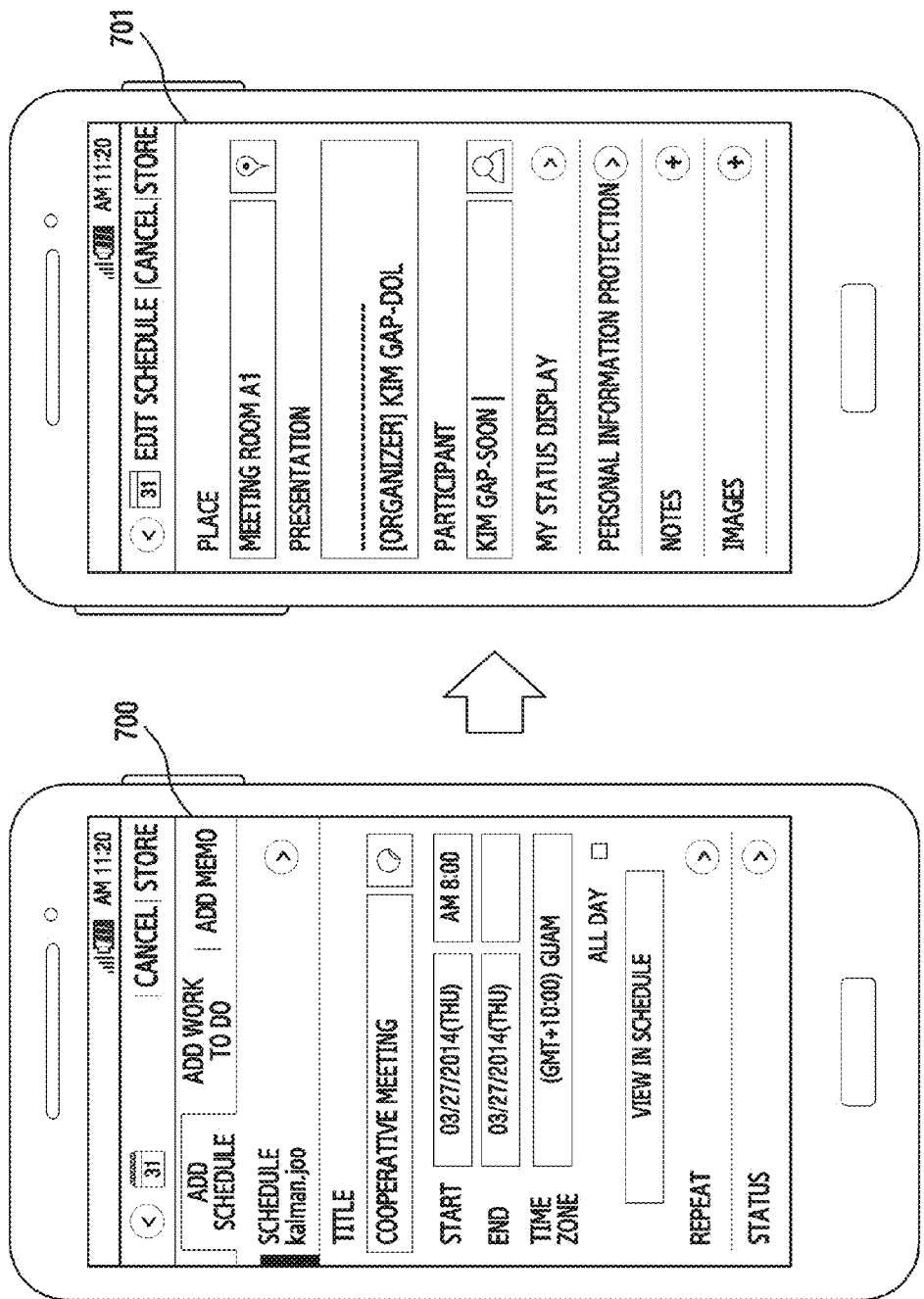
FIGS. 7 and 8 are diagrams illustrating a process of creating a call rejection message reflecting schedule information according to various embodiments of the present disclosure.
Figure 8:
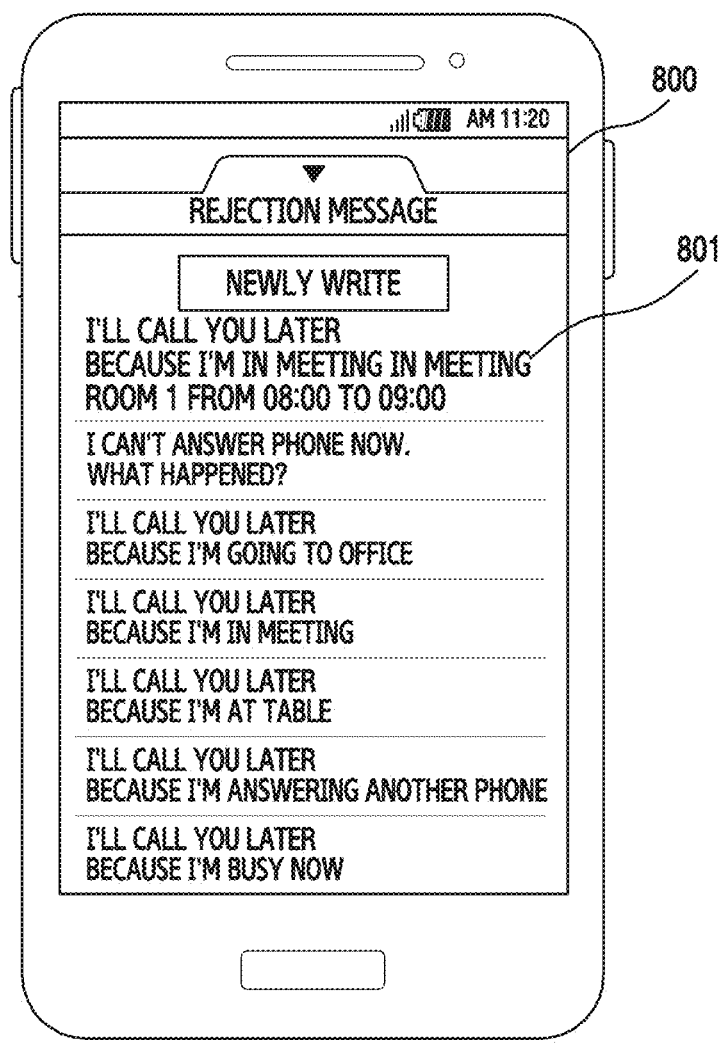

FIGS. 7 and 8 are diagrams illustrating a process of creating a call rejection message reflecting schedule information according to various embodiments of the present disclosure.

Referring to FIG. 7, when a user executes a schedule management application within the electronic device to input a meeting time and a meeting place, the processor 120 of the electronic device may extract corresponding meeting time information and meeting place information from schedule information 700 and 701 and then, automatically create a call rejection message that is effective during the meeting time.

Referring to FIG. 8, a call rejection message list 800, which is created by the processor 120 of the electronic device, may include a call rejection message 801 reflecting a meeting time.

The call rejection message 801 may include content reflecting a meeting time (e.g., 08:00~09:00) and a meeting place (e.g., meeting room 1). When the user selects call rejection against a call having income during the meeting time, the call rejection message 801 may be transmitted automatically, or may be transmitted according to a user's selection. If the meeting time (e.g., 08:00~09:00) lapses, the call rejection message 801 may be deleted automatically, or may be edited or deleted through user's confirmation.

Figure 9:
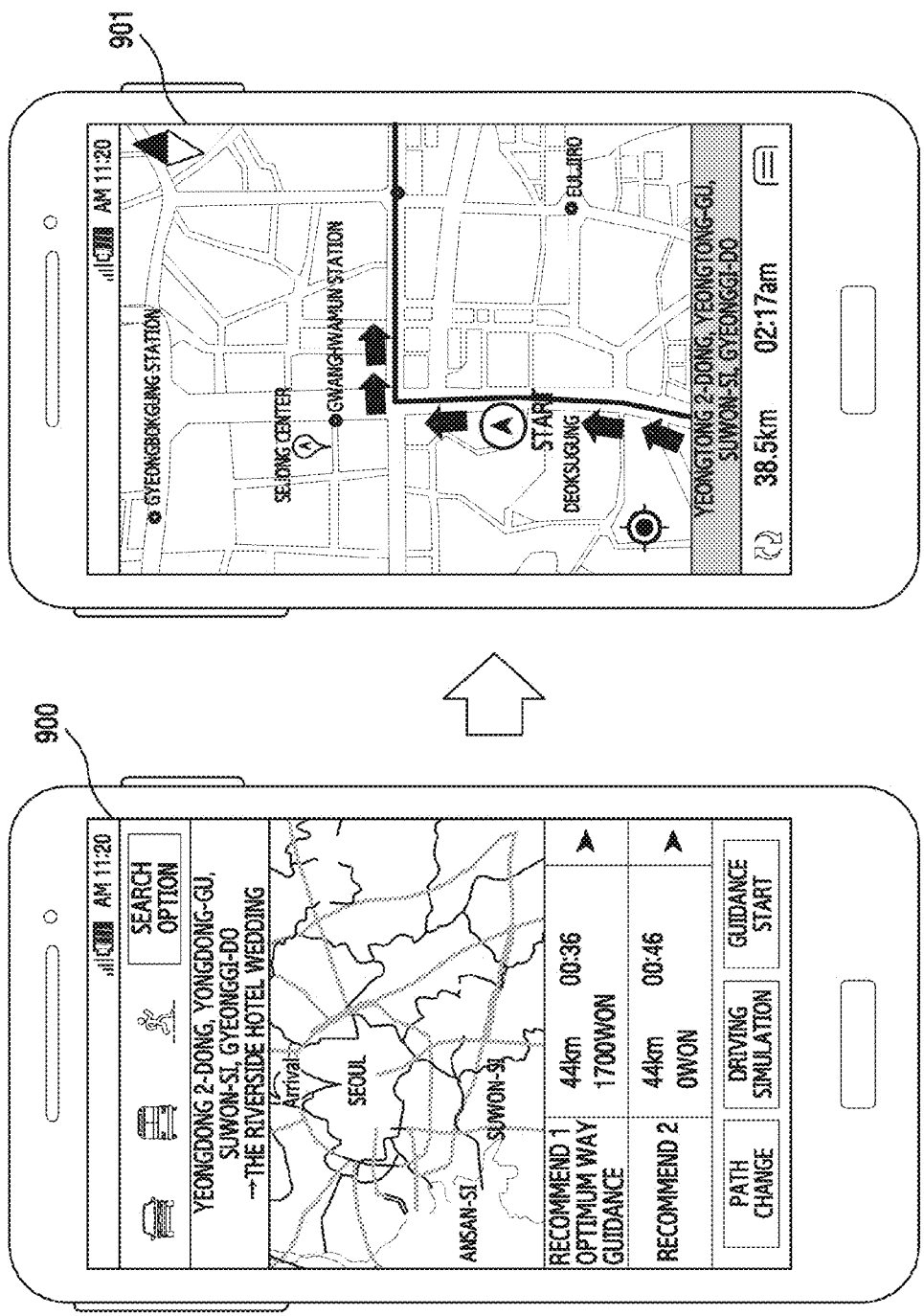
FIGS. 9 and 10 are diagrams illustrating a process of creating a call rejection message reflecting navigation information according to various embodiments of the present disclosure.
Figure 10:
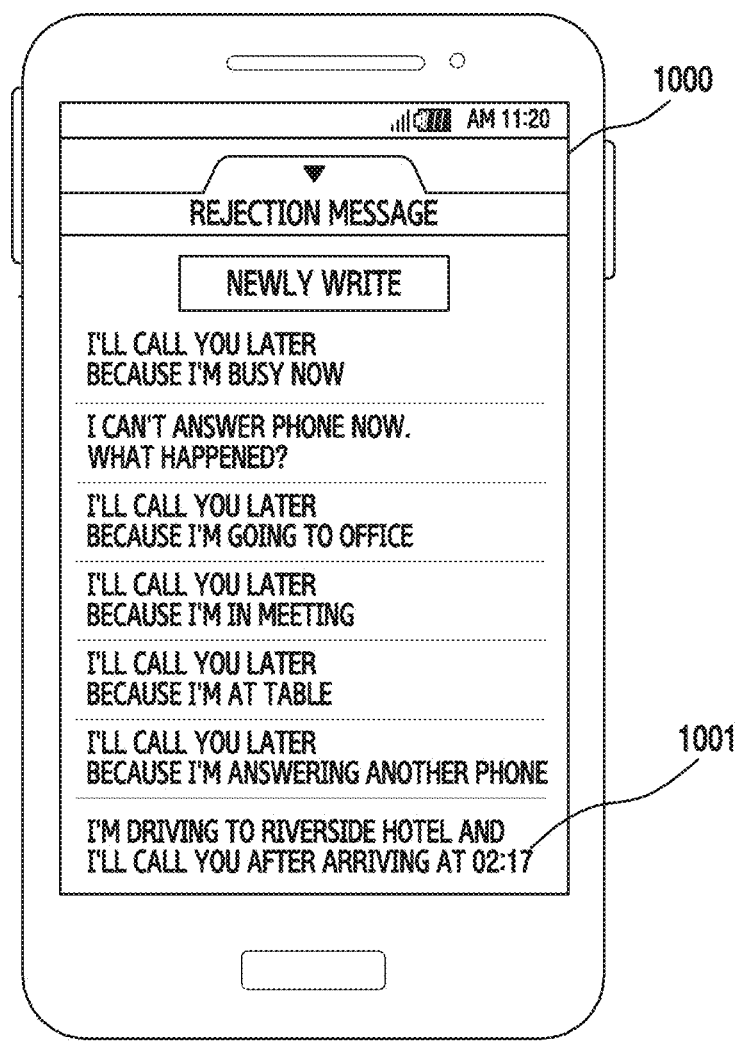

FIGS. 9 and 10 are diagrams illustrating a process of creating a call rejection message reflecting navigation information according to various embodiments of the present disclosure.

Referring to FIG. 9, the processor 120 of the electronic device may create a call rejection message based on navigation information.

For example, when a user executes a navigation application 900 within the electronic device to identify a movement destination and an expected arrival time, the processor 120 of the electronic device may extract corresponding destination information and expected arrival time information 901 within navigation information and then, automatically create a call rejection message that is effective up to before the expected arrival time.

Referring to FIG. 10, a call rejection message 1001 included in a call rejection message list 1000 may include content reflecting a destination (e.g., the Riverside Hotel) and an expected arrival time (e.g., 02:17).

In addition, when a user selects call rejection against a call having income up to before the expected arrival time, the call rejection message 1001 may be transmitted automatically, or may be transmitted according to a user's selection. If the expected arrival time lapses, the call rejection message 1001 may be deleted automatically, or may be edited or deleted through user's confirmation.

Figure 11:
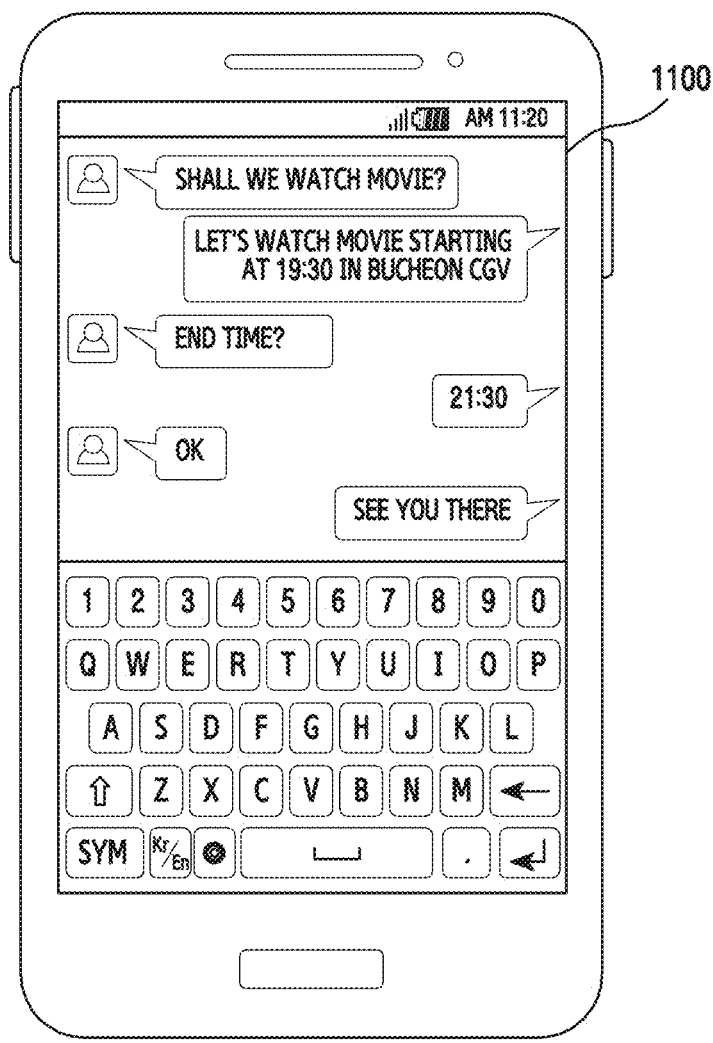
FIGS. 11 and 12 are diagrams illustrating display screens displaying various text messages according to various embodiments of the present disclosure.
Figure 12:
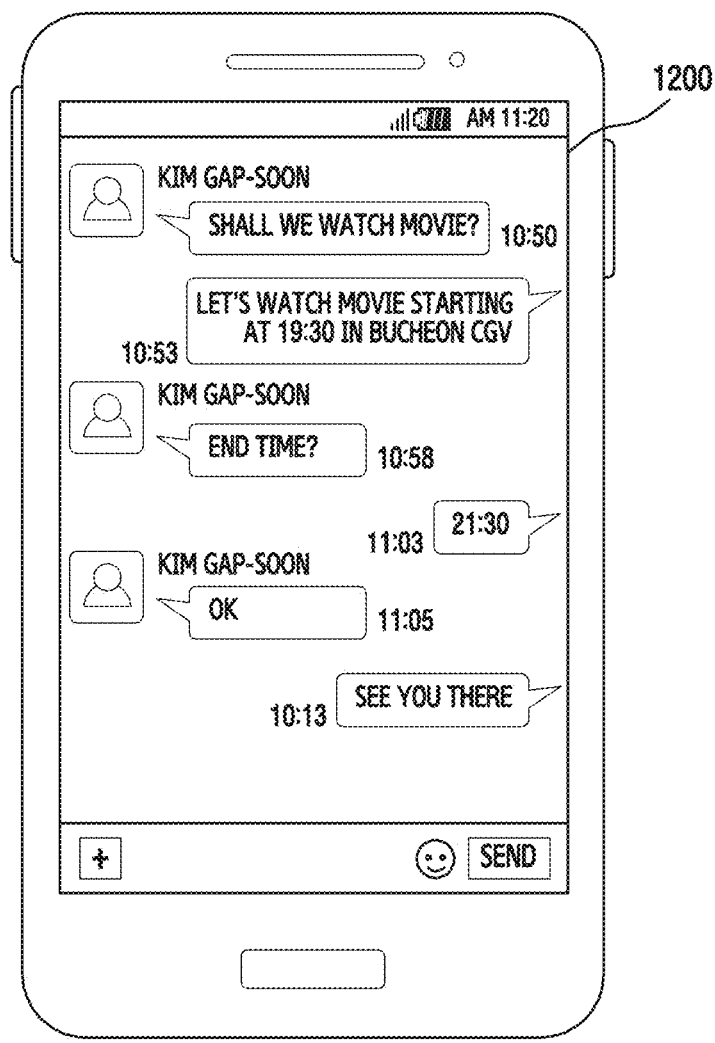

FIGS. 11 and 12 are diagrams illustrating display screens displaying various text messages according to various embodiments of the present disclosure.

Referring to FIGS. 11 and 12, for example, the processor 120 of the electronic device may create a call rejection message 1100 and 1200 based on user's text message information of an SMS or social networking service (SNS). When a user transmits/receives a text message through the SMS, or transmits/receives the text message through the SNS, the processor 120 of the electronic device may extract user's event or schedule information within the transmitted/received text message and then, automatically create a call rejection message 1100 and 1200 reflecting the event or schedule information.

For example, the processor 120 of the electronic device may analyze the content of a text message exchanged between a user (e.g., KIM Gap-Dol) and a counterpart user (e.g., KIM Gap-Soon) to recognize kind information (e.g., a movie) of an event, place information (e.g., the Bucheon CGV movie theater), and time information (e.g., 19:30~21:30) and then, automatically create a call rejection message 1100 and 1200 reflecting the kind, place, and time of the event.

An operation of analyzing the content of the text message may be performed in the electronic device, or may be performed interworking with a network server providing various supplementary services to provide the kind, place, and time information of the event.

The call rejection message may include content indicating the kind, place, and time of the event. When the user selects call rejection against a call having income during the time (e.g., 19:30~21:30), the call rejection message may be transmitted automatically, or may be transmitted according to a user's selection. If the event time (e.g., 19:30~21:30) lapses, the call rejection message may be deleted automatically, or may be edited or deleted through user's confirmation.

Figure 13:
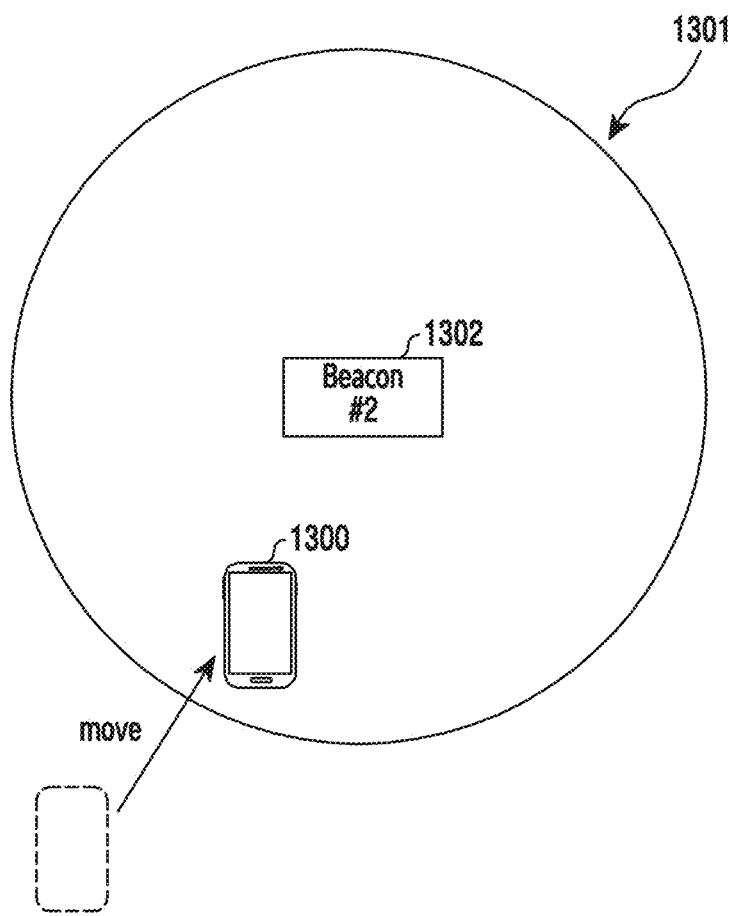
FIG. 13 is a diagram illustrating a situation of receiving a beacon signal in an electronic device according to various embodiments of the present disclosure.

FIG. 13 is a diagram illustrating a situation of receiving a beacon signal in an electronic device according to various embodiments of the present disclosure.

Referring to FIG. 13, the processor 120 of an electronic device 1300 may create a call rejection message based on beacon information. If a beacon signal is received from a beacon transmitter 1302 installed in a specific place 1301, the processor 120 of the electronic device 1300 may use position information of the beacon transmitter 1302 included in the beacon signal to create a call rejection message.

The beacon service is a service in which, when a user enters a specific place with carrying an electronic device, the user receives information capable of knowing a current position of the electronic device from a beacon transmitter. For example, if the beacon service is provided in a state in which the user enters a movie theater or a shop, the processor 120 of the electronic device 1300 may extract position information included in the beacon signal to easily know its own current position, and may use this to automatically create a call rejection message.

Further, if using a similar indoor positioning service as well as the beacon information, the processor 120 of the electronic device 1300 may know an accurate current indoor position and therefore, may easily detect a current situation of a user.

For example, when a user receives a beacon signal after entering a specific place 'SS-PLAZA', the processor 120 of the electronic device 1300 may create a call rejection message of "I can't answer the phone because I'm on shopping at SS-PLAZA". When the user selects call rejection at call incoming, the electronic device may show one candidate among transmissible call rejection messages.

In another example, the processor 120 of the electronic device may create a call rejection message based on sensor information. For example, when a user is taking exercise with putting the electronic device in his/her pocket and an incoming mode is a vibration mode, there may be a case in which the processor 120 of the electronic device fails to recognize call incoming. In this context, when an option is selected as automatic transmitting of a call rejection message, the processor 120 of the electronic device may use an acceleration sensor to sense that the user is taking exercise, and may automatically create and transmit a call rejection message of notifying that a current situation of the user is taking exercise. The call rejection message may include the content of "I'll contact later because I'm taking exercise".

In an embodiment of the present disclosure, the processor 120 of the electronic device may create a call rejection message based on application information. For example, if a user does not want to be interrupted while enjoying a movie or playing a game with the electronic device, the processor 120 of the electronic device may set an automatic call rejection mode.

If the automatic call rejection mode is set, the processor 120 of the electronic device may determine whether any application is being currently run or any contents are being played back. If a multimedia related application of a media player is being executed, the processor 120 of the electronic device may detect contents information that is being played back and automatically create and transmit a call rejection message of "I'll call you later because I'm watching a movie" or "I'll call you later because I'm enjoying music". In addition, if a game application is being executed, the electronic device may automatically create and transmit a call rejection message of "I'll call you later because I'm playing a game".

Figure 14:
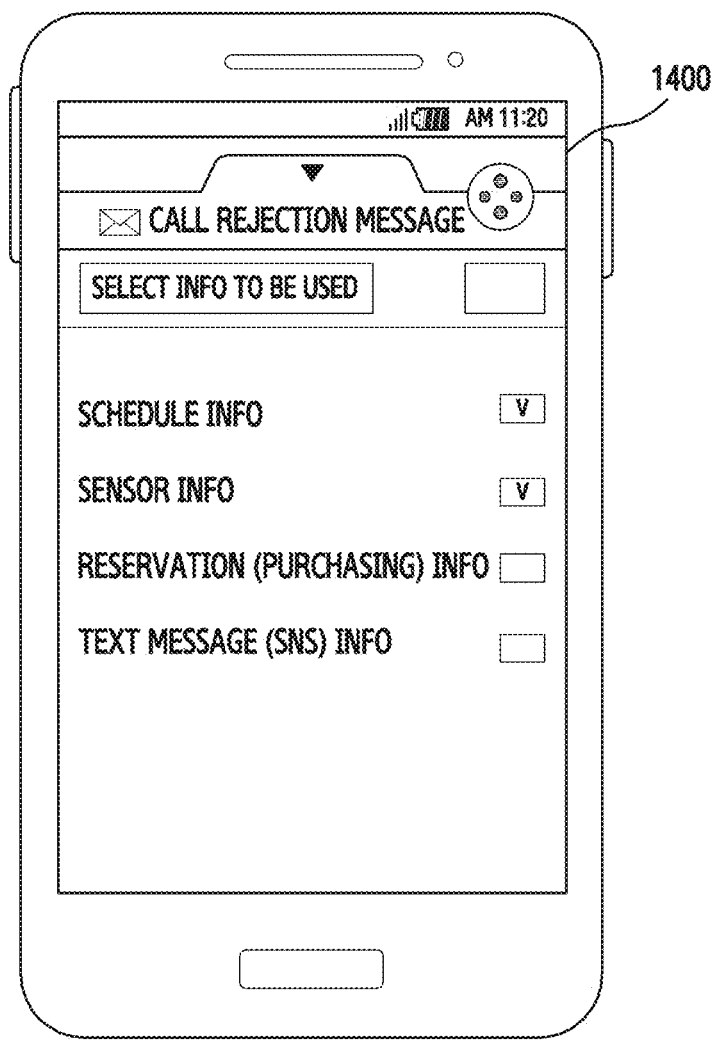
FIG. 14 is a diagram illustrating a display screen for selecting information to be used to create a call rejection message according to various embodiments of the present disclosure.

FIG. 14 is a diagram illustrating a display screen for selecting information to be used to create a call rejection message according to various embodiments of the present disclosure.

Referring to FIG. 14, a user of the electronic device may arbitrarily select the information to be used to create the call rejection message. When the user selects schedule information and sensor information as ON and selects reservation (purchasing) information and text message (SMS) information as OFF in a user selection menu 1400 of the electronic device, the call rejection message may be automatically created based on the schedule information and the sensor information.

In addition, the electronic device may convert the call rejection message into a voice message, not a text message, and transmit the voice message. For example, when a counterpart user makes a call by a landline, the electronic device may convert the call rejection message from a text message to a voice message to transmit the voice message, or may directly create and transmit a voice message without text message creation.

If it is determined that a counterpart phone is a landline phone by identifying a phone number of an incoming call, the transmission of the voice message may be implemented through conversion of the call rejection message from the text message to the voice message. For reference, when a text to voice converter is included within the electronic device, an operation of converting the text message into the voice message may be performed in the electronic device, or may be performed interworking with a network server providing various supplementary services.

On the other hand, when the call rejection message is transmitted automatically without a user's selection process, a current situation of a user is exposed intact to the external and therefore, unwanted personal information may be exposed to the external. Accordingly, the processor 120 of the electronic device may confirm information of a sender of an incoming call, for example, caller identification, or contact information previously stored within the electronic device, and restrict user's current situation information included in the call rejection message depending on the sender of the incoming call.

For example, if a user gets an incoming call from an acquaintance who works in a competing company while being leading a meeting on an important project, the processor 120 of the electronic device transmits a call rejection message of the common content of "I'll call you later because I can't answer the phone now".

On the other hand, if the user gets an incoming call from a fellow worker, the processor 120 of the electronic device transmits a call rejection message including user's current situation information of "I'll call you later because I'm in a meeting with KIM Gap-Soon about S5-project in a meeting room 1 from 08:00 to 09:00".

Further, the processor 120 of the electronic device determines whether an incoming call is made through intranet or is made through the Internet. If the call is made through the intranet, the processor 120 of the electronic device may transmit a call rejection message reflecting a detailed current situation of a user. If the call is made through the Internet, the processor 120 of the electronic device may transmit a common call rejection message reflecting no current situation of the user.

Figure 15:
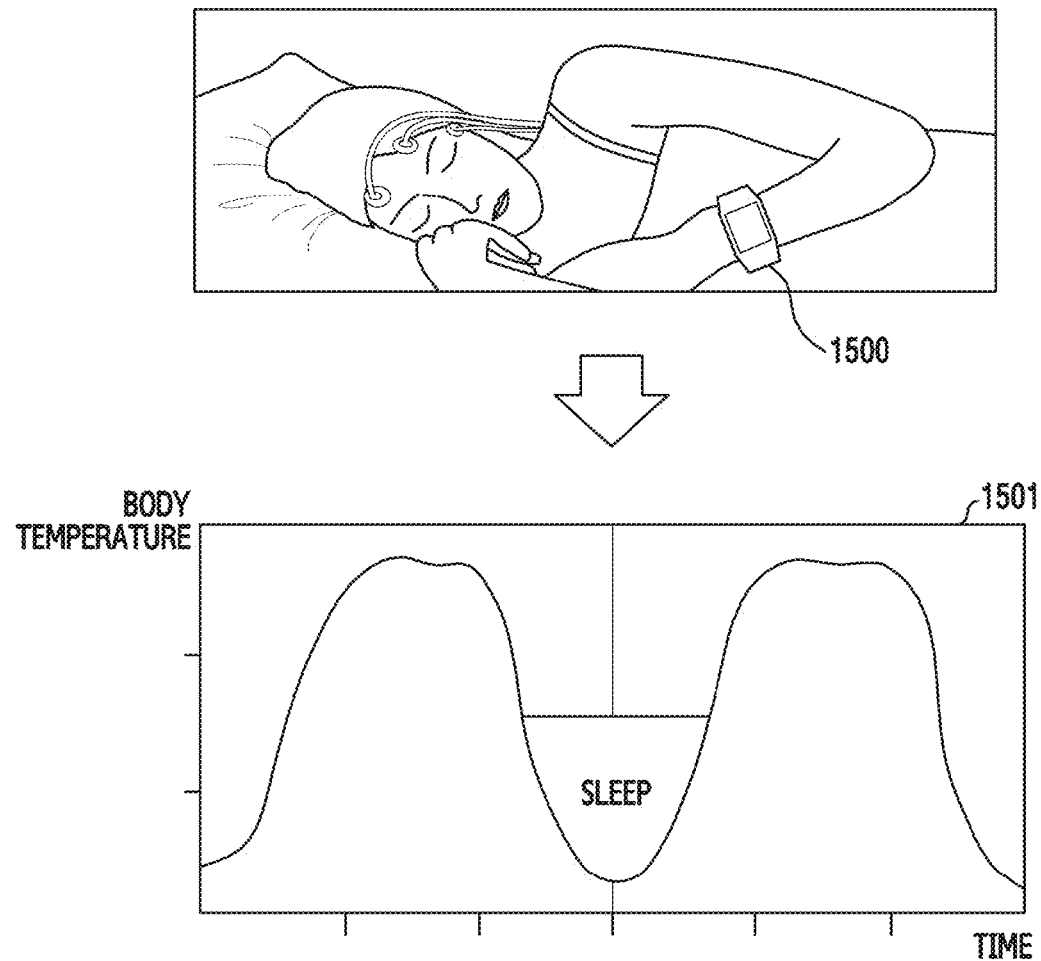
FIG. 15 is a diagram illustrating a situation of detecting a user's sleep state in an electronic device according to various embodiments of the present disclosure.

FIG. 15 is a diagram illustrating a situation of detecting a user's sleep state in an electronic device according to various embodiments of the present disclosure.

Referring to FIG. 15, the processor 120 of the electronic device may create a call rejection message based on a wearable device. For example, recently, a wearable device 1500 has a function of determining a user's health, and may provide various functions in association with a body of the electronic device. As an example, the wearable device 1500 already has a heart rate measurement and body temperature measurement function and, in future, may mount a brain wave measurement sensor.

By analyzing a measurement graph 1501 for a body temperature, pulse, and brain wave of a user who wears the wearable device 1500, the processor 120 of the electronic device may determine if the user is really in a deep sleep state.

If the user is in the deep sleep state, the processor 120 of the electronic device may automatically create and transmit a call rejection message of "I'll contact later because I'm sleep". Further, the processor 120 of the electronic device may use various sensor data of the wearable device 1500 to distinguish a deep sleep and a shallow sleep. If the user is in the deep sleep state, the processor 120 of the electronic device may automatically transmit the call rejection message as above. If the user is in a shallow sleep state, the processor 120 of the electronic device may make a phone bell ring.

For reference, the processor 120 of the electronic device may use various sensors of the wearable device 1500 to determine even a user's feeling state, and may also create a call rejection message depending on the determined user's feeling state.

On the other hand, after the call rejection message is transmitted to a counterpart user, if there is a change of a current situation of a user of the electronic device or a preset certain time lapses, the electronic device may perform an alarm display operation for notifying for the user of the electronic device to make a call to the counterpart user.

For example, after transmitting the call rejection message to the counterpart user, to lead the user to make a call to the counterpart user, the processor 120 of the electronic device may add a call rejection time and the content of the call rejection message, as management items, such as a memo, a schedule, an alarm, and the like.

In addition, the processor 120 of the electronic device may give an alarm to a user at certain intervals, based on the added management items such as the memo, the schedule, and the alarm, or give an alarm at ending of a corresponding schedule, based on user's schedule information. The processor 120 of the electronic device may display a UI, such as direct dial as one of the alarms, for the user to make a call conveniently and simply.

Further, when the processor 120 of the electronic device uses sensor information to automatically create a call rejection message, at a time when there is a change of a measurement value of a specific sensor, the processor 120 of the electronic device may give an alarm for the user to make a call. For example, if a measurement value of an acceleration sensor is changed into '0', because a current situation of the user is stopping, the processor 120 of the electronic device may give an alarm for the user to make a call to a counterpart user who has transmitted the call rejection message.

On the other hand, according to various embodiments of the present disclosure, the processor 120 of the electronic device may automatically create and display a recommended text message reflecting a current situation of a user as well as create a call rejection message reflecting the current situation of the user.

For example, in a state in which a user is driving a car or is watching a movie or is at meeting, if receiving a text message from a counterpart user through an SMS or SNS, in response to this, he/she must write a text message for notifying a current situation of a user. In this context, the processor 120 of the electronic device may automatically create and display the text message reflecting the current situation of the user, as a recommended text message. In this context, the user may confirm, select, and transmit the text message, or may edit only the partial content of the text message and transmit the edited text message simply and conveniently.

In an embodiment of the present disclosure, the processor 120 of the electronic device may create a call rejection message, based on vehicle interface information. If being connected, for example, to a vehicle audio system through a USB and various short-range wireless communications, such as BT pairing, BT low energy (BLE), and NFC, the processor 120 of the electronic device may automatically recognize that a user rides a vehicle.

In addition, the processor 120 of the electronic device may use speed information received from a vehicle or a GPS of the vehicle to automatically recognize whether the vehicle is moving or stopping. If the vehicle is moving, the processor 120 of the electronic device may automatically transmit a call rejection message. If the vehicle is stopping, the processor 120 of the electronic device may transmit the call rejection message according to a user's selection.

In an embodiment of the present disclosure, the processor 120 of the electronic device may create a call rejection message, based on user's life pattern information. For example, if a user of the electronic device is a general job worker, the user may have a daily life pattern of going to the office by bus, subway or vehicle in weekday morning and working at the office in daylight.

The processor 120 of the electronic device may expect when, where, and what a user will do, based on the user's life pattern information. Further, with reference to a user's current position information, the processor 120 of the electronic device may increase the accuracy of the above expectation. In addition, content corresponding to the expectation result may be included in a call rejection message or recommended text message.

In an embodiment of the present disclosure, the processor 120 of the electronic device may create a call rejection message, based on device to device (D2D) service information. For example, if determining which kind of device is connected to the electronic device, the processor 120 of the electronic device may detect a current situation of a user.

If a game player is connected to the electronic device, the current situation of the user may be game playing. If a TV or set-top box is connected to the electronic device, the current situation of the user may be watching a movie or a multimedia. If an audio system is connected to the electronic device, the current situation of the user may be enjoying music.

Accordingly, the processor 120 of the electronic device may automatically create and transmit the call rejection message reflecting the above current situation of the user.

Figure 16:
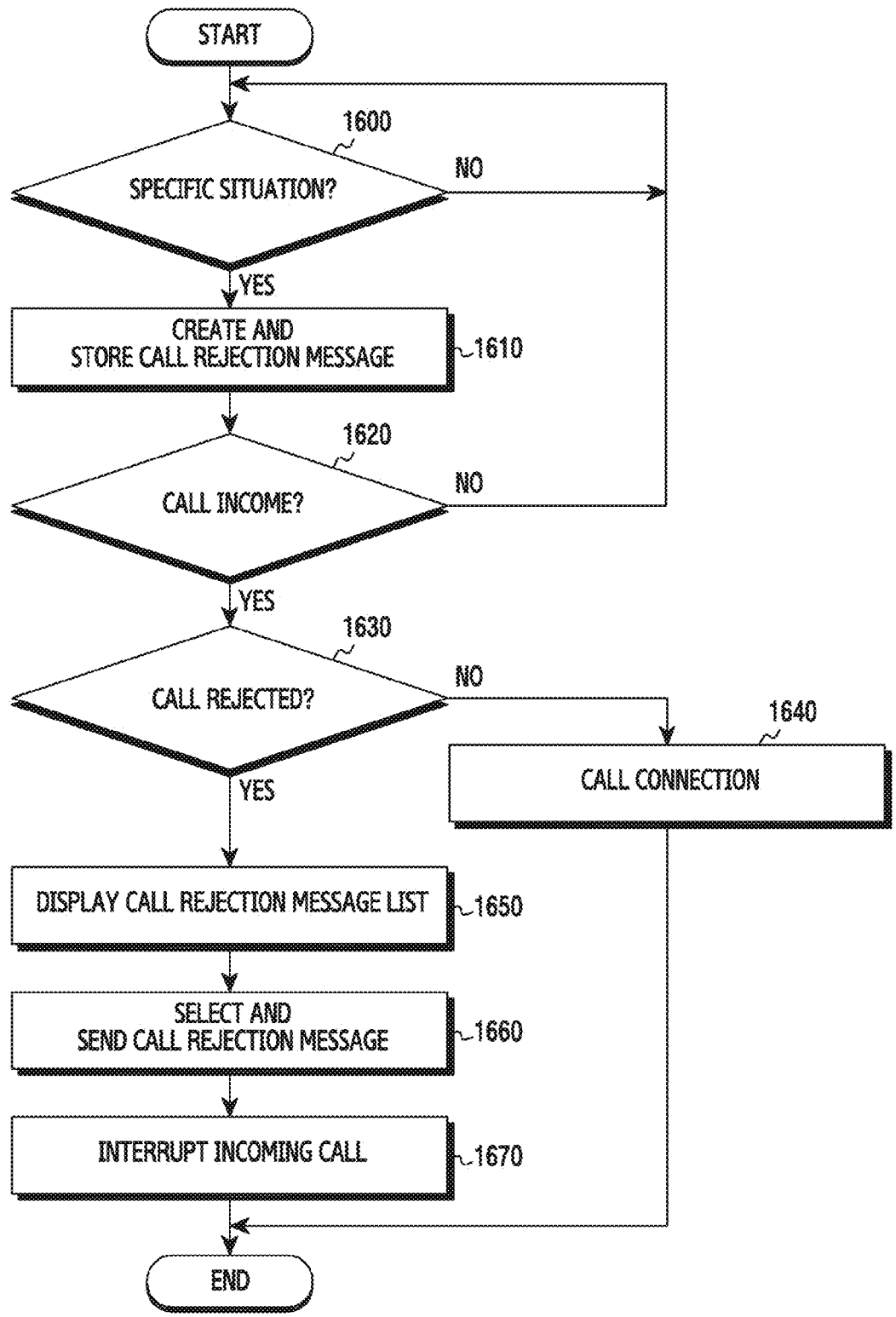
FIG. 16 is a flowchart illustrating a call rejection method of an electronic device according to various embodiments of the present disclosure.

FIG. 16 is a flowchart illustrating a call rejection method of an electronic device according to various embodiments of the present disclosure.

Referring to FIG. 16, in operation 1600, the processor 120 of the electronic device monitors whether a specific situation takes place. If the specific situation takes place, for example, if a user is in the specific situation, such as driving, meeting, and movie watching, in operation 1610, the processor 120 of the electronic device automatically create and store a call rejection message associated with the specific situation.

The call rejection message may be automatically created and stored not only when a user cannot make a call at call income but also when the user cannot write and transmit a response message in response to a received message.

For example, when the user reserves a movie ticket on-line with the electronic device, the processor 120 of the electronic device may extract running time information and movie theater information of a corresponding movie from the reservation information and then, automatically create a call rejection message that is effective during the movie running time.

In operation 1620, the processor 120 of the electronic device monitors if a call is income. Further, the processor 120 of the electronic device may also monitor if a text message is received. If the call is income or the text message is received, in operation 1630, the processor 120 of the electronic device monitors if the user selects call rejection. If the user selects call connection, in operation 1640, the processor 120 of the electronic device performs common call connection.

On the contrary, if the user selects the call rejection, in operation 1650, the processor 120 of the electronic device displays a call rejection message list. In operation 1660, the processor 120 of the electronic device selects and transmits any one call rejection message designated by the user. In operation 1670, the processor 120 of the electronic device interrupts the incoming call. The call rejection message may be automatically transmitted without an operation of displaying the call rejection message list.

The operation 1660 of transmitting the call rejection message may be performed earlier than the operation 1670 of interrupting the incoming call, or the operation 1660 of transmitting the call rejection message and the operation 1670 of interrupting the incoming call may be performed concurrently. The operation 1650 of displaying the call rejection message list may be also omitted. For example, at call rejection, the processor 120 may also automatically select any one call rejection message, which automatically reflects a current situation of a user on a basis of a current time, from the call rejection message list, and transmit the selected call rejection message.

For example, if the current time corresponds to a movie running time zone, the processor 120 of the electronic device may search a call rejection message related to movie playing from the call rejection message list and automatically transmit the found call rejection message. Upon lapse of the movie running time zone (e.g., 19:30~21:30), the call rejection message related to the movie playing may be deleted automatically, or may be deleted or edited through user's confirmation.

Figure 17:
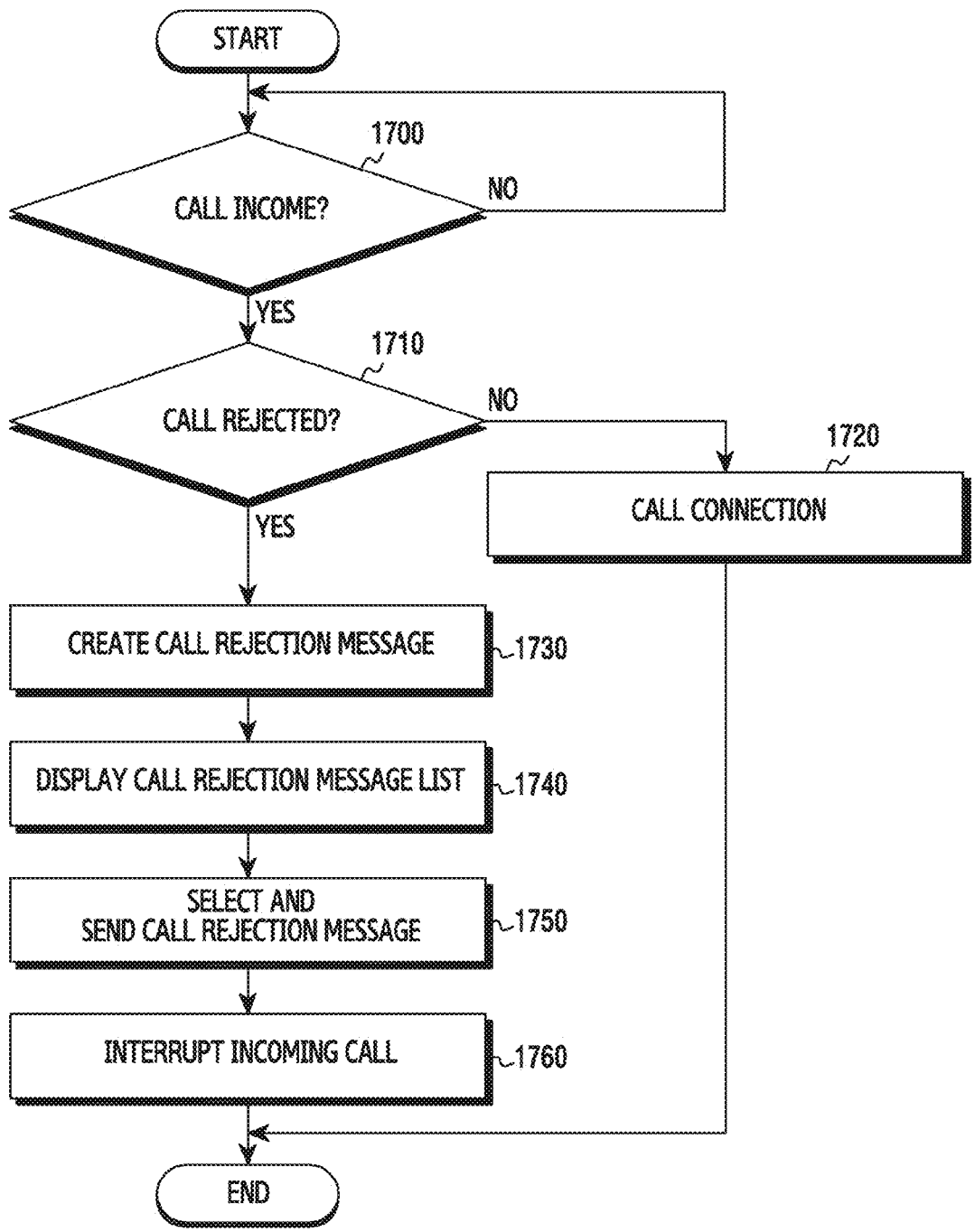
FIG. 17 is a flowchart illustrating another call rejection method of an electronic device according to various embodiments of the present disclosure.

FIG. 17 is a flowchart illustrating a call rejection method of an electronic device according to various embodiments of the present disclosure.

Referring to FIG. 17, in operation 1700, the processor 120 of the electronic device monitors whether a call is income. If the call is income, in operation 1710, the processor 120 of the electronic device monitors if a user selects call rejection. If the user selects call connection, in operation 1720, the processor 120 of the electronic device performs common call connection.

On the contrary, if the user selects the call rejection, in operation 1730, the processor 120 of the electronic device may real-time create a call rejection message automatically reflecting a current situation of a user. In operation 1740, the processor 120 of the electronic device may display a call rejection message list including the call rejection message. In operation 1750, the processor 120 of the electronic device may transmit any one call rejection message selected by the user. In operation 1760, the processor 120 of the electronic device may interrupt the incoming call.

In addition, the real-time created call rejection message may be also automatically transmitted without the operation 1740 of displaying the call rejection message list and the operation 1750 of user's selection.

Various embodiments of the present disclosure may reflect a current situation of a user to automatically create various messages in electronic devices of various types, such as smart phones or tablet PCs, thereby being capable of providing a convenience to a user.

Methods according to various embodiments stated in claims or specification of the present disclosure may be implemented in a form of hardware, software, or a combination of hardware and software. If the methods are implemented by the software, a computer-readable storage medium storing one or more programs (i.e., software modules) may be provided. The one or more programs stored in the computer-readable storage medium are configured to be executed by one or more processors 120 within an electronic device. The one or more programs may include instructions for enabling the electronic device to execute the methods according to the various embodiments stated in the claims and/or specification of the present disclosure.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

In addition, the programs may be stored in an attachable storage device accessible through a communication network, such as the Internet, an intranet, a local area network (LAN), a wireless LAN (WLAN) or a storage area network (SAN) or a communication network constructed by a combination of them. This storage device may access a device performing an embodiment of the present disclosure through an external port. In addition, a separate storage device on the communication network may access a device performing an embodiment of the present disclosure.

In the aforementioned concrete embodiments of the present disclosure, constituent elements of the disclosure have been expressed in the singular number or the plural number in accordance to the proposed concrete embodiments of the present disclosure. But, for description convenience, the expression of the singular number or plural number is selected suitable to a proposed situation, and various embodiments of the present disclosure are not limited to singular or plural constituent elements. The constituent element may be, although expressed in the plural number, constructed in the singular number, or the constituent element may be, although expressed in the singular number, constructed in the plural number.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method in an electronic device, the method comprising:
   determining, by a user situation detector, a current situation of a user of the electronic device based on data input through an executed application of the electronic device;
   receiving an incoming call or an incoming message;
   in response to the incoming call or the incoming message, automatically creating, by a new message creator, a message reflecting the current situation of the user of the electronic device as determined by the user situation detector, and
   transmitting the automatically created message reflecting the current situation of the user of the electronic device,
   wherein the message is created in real-time at a time point of rejection of a call connection, and
   wherein the determining of the current situation is based on at least one of reservation information, schedule information, user movement information, HTML information, navigation information, application information, text message information, device to device (D2D) service information, life pattern information, or vehicle interface information.

2. The method of claim 1,
   wherein the message is created previously, as a call rejection message against the incoming call, at a time point of occurrence of a specific situation and stored in a memory of the electronic device, and
   wherein, when rejecting the call connection, the message is transmitted automatically, or is transmitted according to selection of the user of the electronic device.

3. The method of claim 1, wherein the determining of the at least one current situation is further based on at least one of beacon information, and sensor information.

4. The method of claim 2, further comprising:
   determining, before transmitting of the call rejection message, whether the transmitting of the call rejection message will be via a transmitting landline and,
   if it is determined that the transmitting of the call rejection message will be via the transmitting landline, converting a text message into a voice message and forwarding the voice message.

5. The method of claim 3, wherein, if an effective time lapses based on the at least any one information, the call rejection message is automatically deleted, or is deleted or edited according to a user's selection.

6. The method of claim 1, wherein the content of the message is changed into an honorific language or one part of the content of the message is limited, according to a social standing of the other user of the other electronic device who will receive the message or according to a connection communication network.

7. The method of claim 1, further comprising notifying, after the message is transmitted, if there is a change of the at least one current situation of the user or a certain time lapses, the electronic device to contact another electronic device receiving the message in one of methods comprising a voice call.

8. The method of claim 1, wherein the message is created and stored previously, as a response message to the incoming message, at a time point of occurrence of a specific situation, or is created in real-time at a time point of reception of the incoming message.

9. The method of claim 1, wherein the message is automatically created and displayed, as a recommended message, while the user of the electronic device is chatting based on a short message service (SMS) or a social network service (SNS).

10. An electronic device comprising:
    a communication module; and
    a processor configured to:
    control the communication module,
    determine, by a user situation detector, a current situation of a user of the electronic device based on data input through an executed application of the electronic device,
    receive an incoming call or an incoming message,
    in response to the incoming call or the incoming message, automatically create, by a new message creator, a message reflecting the current situation of the user of the electronic device as determined by the user situation detector, and
    transmit the automatically created message reflecting the current situation of the user of the electronic device,
    wherein the message is created in real-time at a time point of rejection of a call connection, and
    wherein the determining of the current situation is based on at least one of reservation information, schedule information, user movement information, HTML information, navigation information, application information, text message information, device to device (D2D) service information, life pattern information, or vehicle interface information.

11. The electronic device of claim 10,
    wherein the message is created previously, as a call rejection message against the incoming call, at a time point of occurrence of a specific situation and stored in a memory of the electronic device, and
    wherein, when rejecting the call connection, the message is transmitted automatically, or is transmitted according to selection of the user of the electronic device.

12. The electronic device of claim 10, wherein the processor is further configured to determine the at least one current situation based on at least one of beacon information, and sensor information.

13. The electronic device of claim 11,
    wherein the processor is further configured to determine, before transmitting of the call rejection message, whether the transmitting of the call rejection message will be via a transmitting landline, and
    wherein, if the processor determines that the transmitting of the call rejection message will be via the transmitting landline, the processor is further configured to convert a text message into a voice message and forward the voice message.

14. The electronic device of claim 12, wherein, if an effective time lapses based on the at least any one information, the processor is further configured to automatically delete the call rejection message, or delete or edit the call rejection message according to a user's selection.

15. The electronic device of claim 10,
    wherein the processor is further configured to:
    control the communication module to transmit the message,
    change one part of the content of the message into an honorific language, or
    limit one part of the content of the message, according to a social standing of the other user of the other electronic device who will receive the message or according to a connection communication network.

16. The electronic device of claim 10, wherein, after the processor controls the communication module to transmit the message, if there is a change in the at least one current situation of the user or a certain time lapses, the processor is further configured to notify the electronic device to contact another electronic device receiving the message in one of methods comprising a voice call.

17. The electronic device of claim 10, wherein the message is created previously, as a response message to the incoming message, at a time point of occurrence of a specific situation and stored in a memory of the electronic device, or is created in real-time at a time point of reception of the incoming text message.

18. The electronic device of claim 10, wherein the message is automatically created and displayed, as a recommended text message, while the user of the electronic device is chatting based on a short message service (SMS) or a social network service (SNS).

19. At least one non-transitory computer-readable storage medium for storing a computer program of instructions configured to be readable by at least one processor for instructing the at least one processor to execute a computer process for performing the method of claim 1.

\* \* \* \* \*